United States Patent

[11] 3,609,543

| [72] | Inventor | Raymond A. Whitmore |
| | | La Habra, Calif. |
| [21] | Appl. No. | 829,205 |
| [22] | Filed | June 2, 1969 |
| [45] | Patented | Sept. 28, 1971 |
| [73] | Assignee | Hy-Cal Engineering |
| | | Santa Fe Springs, Calif. |

[54] METER SYSTEM WITH CONTINUOUSLY VARIABLE RANGE HAVING ZERO AND FULL SCALE CALIBRATION FEATURES
4 Claims, 5 Drawing Figs.

[52] U.S. Cl. .................................................. 324/123 R, 324/74, 324/115
[51] Int. Cl. .................................................. G01r 1/30, G01r 15/08, G01r 35/00
[50] Field of Search ........................................... 324/123, 115, 130, 99, 30, 74

[56] References Cited
UNITED STATES PATENTS

| 1,992,022 | 2/1935 | Bedford | 324/130 X |
| 2,208,329 | 7/1940 | Morelock | 324/115 |
| 2,889,517 | 6/1959 | Ehret | 324/99 |
| 3,095,535 | 6/1963 | Jaffe et al. | 324/30 |
| 3,461,385 | 8/1969 | Bayer | 324/130 |

Primary Examiner—Rudolph V. Rolinec
Assistant Examiner—Ernest F. Karlsen
Attorney—Nilsson & Robbins ABSTRACT: A meter system is disclosed incorporating a thermally insulated DC amplifier the operation of which is controlled by variable gain and trim resistors. The system also incorporates a calibration circuit for providing variable voltages in accordance with the setting of a potentiometer. The potentiometer of the calibration circuit and the variable gain resistor are ganged together to simplify calibration of the operating range for input signals applied to the amplifier, the output of which is in turn applied to a meter movement having substantial angular range. Various accessory package circuits are also disclosed for use in conjunction with the basic metering system to increase the utilization of the system.

INVENTOR
RAYMOND WHITMORE

By Nilsson + Robbins
ATTORNEYS

INVENTOR
RAYMOND WHITMORE

BY Nilsson + Robbins
ATTORNEYS

METER SYSTEM WITH CONTINUOUSLY VARIABLE RANGE HAVING ZERO AND FULL SCALE CALIBRATION FEATURES

BACKGROUND AND SUMMARY OF THE INVENTION

The need frequently arises for a small, compact meter, e.g. a millivolt having reasonable good accuracy while being relatively inexpensive to manufacture, easy to use and relatively maintenance free. As a consequence, considerable effort has been expended in the development and improvement of such meters with the result that such units have reached a high degree of sophistication. However, due to the widespread demand for such instruments, virtually any significant improvement in them represents an important development.

The accelerated trend toward automation and automatic control systems has expanded the use of various transducers for indicating various physical phenomena in the form of low-voltage electrical signals. For example, transducers which operate in the millivolt range are particularly common as to indicate temperature, heat, force and so on. Consequently, the need is intensified for a member as described above that is economical, maintenance free, portable, and simple to use and calibrate.

Various forms of prior meters have incorporated a DC amplifier. Such units have conventionally been designed to be controlled to operate in different ranges and in this regard such prior meters have required calibration (as by tuning the amplifier). Specifically, for example, meter systems of the prior art have been calibrated by adjusting various potentiometers or variable resistors to obtain a desired operating level and range of operation. Such calibration of many prior systems has required multiple adjustments, involving considerable skill and time. Consequently, a substantial need exists for a metering system that can be simply and easily calibrated by an unskilled person.

One of the desirable characteristics for a wide variety of meters is that the unit be flexible in use and application. That is, recognizing the usual situation in which increased flexibility is attained only by increased complexity, there is always a demand for a meter of greater flexibility which is not unduly complex or expensive to manufacture. In general, the present invention comprises a metering system which is simple to use, easy to read, relatively inexpensive to manufacture, flexible in use, and which will provide relatively maintenance-free operation for thousands of hours.

The ease of using instruments constructed in accordance herewith stems from a simplified system of calibration and an effective large scale meter movement. Maintenance free operation of the system results from the fact that very little load is placed on the batteries and the incorporation of structure which insures that the batteries are disconnected when the instrument is not in use. The overall design of the system affords economy and flexibility

BRIEF DESCRIPTION OF THE DRAWINGS

In the drawings which constitute a part of this specification, an exemplary embodiment demonstrating various objectives and features hereof is set forth as follows.

DESCRIPTION OF THE ILLUSTRATIVE EMBODIMENT

Figure 1:
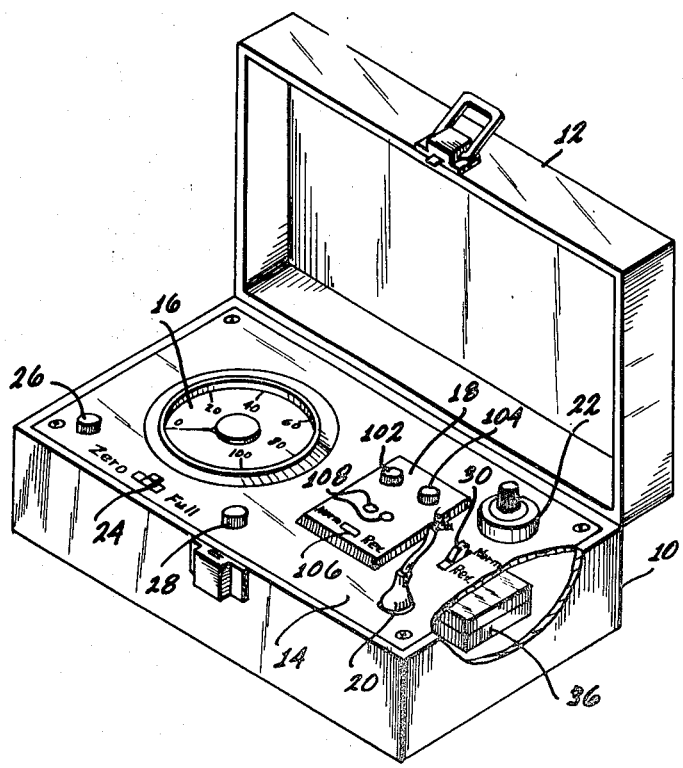
FIG. 1 is a perspective view of a metering system constructed in accordance with the present invention.

Referring initially to FIG. 1, there is shown a metering system constructed in accordance herewith, housed in a meter box 10, which includes a protective cover or top 12, affixed on a hinge over an instrument panel 14. The panel 14 includes: a number of controls (individually described below) a meter face 16, and additionally defines a receptacle for receiving an accessory package 18. The panel 14 also incorporates a receptacle for receiving a male plug connector 20 through which an input signal is supplied to the system. As will be described in detail below, the plug connector 20 also incorporates switch pins which provide energizing connections to batteries located within the system. Such switch pins accomplish electrical isolation of the batteries upon withdrawal of the connector 20 from its receptacle, which operation is necessary to close the lid or top 12 of the instrument box 10.

Considering the operational use of the system as shown in FIG. 1, it is to be noted that the meter face 16 has a scale extending well over 180°, specifically to some 250°, which scale is designated in increments from zero to 100. A knob 22 on the instrument panel 16 also bears indications from zero to 100; however, without the relation to the scale of the meter face 16.

Assuming the desire to calibrate the meter so that a voltage or potential of 25 millivolts would result in a full scale deflection over the meter face 16, the knob 22 is simply set to 25 then a switch 24 is initially positioned to the left in the zero adjust position while the knob 26 is dialed to "zero" the meter. Thereafter, the switch 24 is set to the right for the "full" scale adjustment and a knob 28 is employed to set the meter deflection to full scale. These three simple operations calibrate the meter without other complex operations as customary repeated tuning operations that are attendant calibration of certain prior meters. Consequently, the meter reads in the calibrated scale with the polarity treatment of the input signal controlled by a switch 30 as is somewhat conventional in prior systems.

Figure 2:
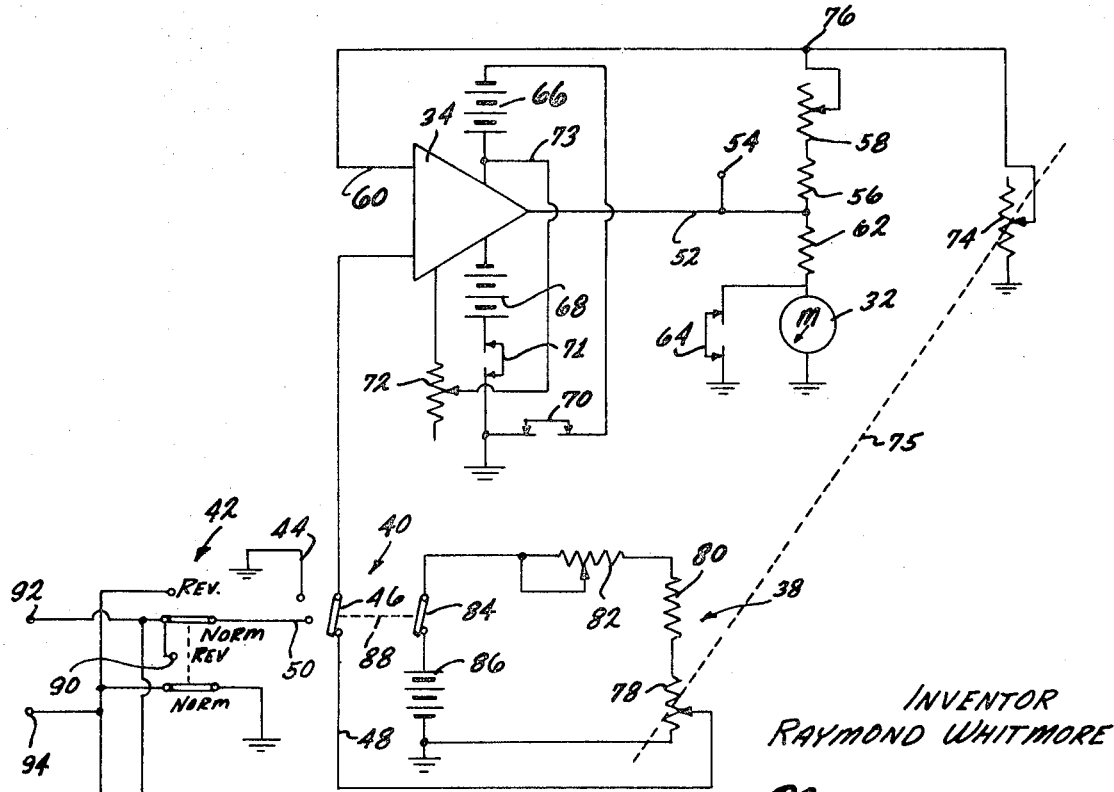
FIG. 2 is a circuit diagram of the basic metering system employed in the unit of FIG. 1.

Considering the electrical components and details of the metering system, reference will now be had to FIG. 2 showing the circuit diagram. The meter movement 32 of the system is driven by a DC operational amplifier 34. The amplifier may take a wide variety of different specific forms; however, in practice it has been found practical to employ a solidstate unit in a relatively small package which can be housed in a heat-insulating box 36 (FIG. 1) which may be formed of polystyrene foam.

The associated operation of the amplifier 34 in cooperation with the meter movement 32 is controlled by a calibration circuit 38. Depending upon the stage of operation, the input to the amplifier is connected through a switch 40 (lower central) either to: the circuit 38, an input circuit 42 or to a ground line 44. Thus, the switch 40 is a three position unit controlled by the switch button 24 (FIG. 1). The movable contact 46 of the switch 40 engages the ground line 44 when the meter is to be "zero" adjusted. The movable contact 46 is connected to a conductor 48 which is in turn connected to the calibration circuit 38 during intervals of "full scale" adjustment. Lastly, the movable contact 46 is connected to a conductor 50 of the input circuit 42 during actual metering operations.

Considering the basic metering circuit in greater detail, the movable contact 46 of the switch 40 is connected to one input of the amplifier 34. The output conductor 52 from the amplifier 34 is connected to a connection terminal 54 and through a resistor 56 and a variable resistor 58 to provide a feedback connection to another input 60 of the amplifier 34. The output conductor 52 from the amplifier is also connected through a resistor 62 and the meter movement 32 to ground. The meter 32 is shunted by a bar switch 64 which is incorporated in the male plug connector 20 (FIG. 1).

The amplifier 34 (FIG. 2) is provided with power by a pair of batteries 66 and 68 connected to the opposed-polarity inputs of the amplifier 34. The opposed sides of the batteries 66 and 68 are connected together at ground potential through bar switches 70 and 71 which are again integrated in the plug connector 20 as described above. The upper battery 66 (providing B+) is also connected through a conductor 73 and a variable resistor 72 to the trim input of the amplifier 34.

Operational gain control for the amplifier 34 is provided by a variable resistor 74 (extreme right) which is connected to a junction point 76 between the variable resistor 58 and the feedback input conductor 60. The variable resistor 74 is mechanically coupled as indicated by a dashed line 75, to be gang controlled with a potentiometer 78 that is located in the calibration circuit 38. Such combined operation is described below whereby both of the variable resistors 74 and 78 are adjusted by the control knob 22 (FIG. 1).

In view of the above preliminary description of the basic structure of the system, complete understanding thereof may now best be provided by assuming certain operational objectives and explaining the steps and functions involved therein. Consequently, assume it is desired to measure of meter signals with a range between zero and 25 millivolts, and furthermore that in the interest of accuracy and ease of observation, it is desired to use full scale displacement of the meter movement 32. Accordingly, as indicated above the knob 22 is employed to calibrate the system in a single adjustment and in accordance with the assumed example, is set at a full scale value of 25. That operations sets the potentiometer 78 (in the calibration circuit 38) to provide an input of substantially 25 millivolts to the input of the amplifier 34. Concurrently, as a result of the somewhat linear relationship between the variable resistor 74 and the potentiometer 78, the gain control resistor 74 establishes the amplifier 34 at an operating level to substantially drive the meter movement 32 to a full scale displacement on receiving an input of 25 millivolts.

Recapitulating, as a result of the gang control of the variable resistor 74 and the potentiometer 78, calibration is substantially accomplished in a single operation which involves simply setting the knob 22, as described above, at the desired full scale value. Of course, various alternate arrangements can be provided; however, it has been found desirable to provide the potentiometer 78 in precision form. In fact, in one embodiment that element constitutes the only precision component and very effective operation has been attained.

Considering further details of the calibration circuit, the potentiometer 78 is connected in a serial loop with a resistor 80, a potentiometer 82, a switch 84, and a battery 86. The switch 84 is gang controlled with the switch 40 (as indicated by a dashed line 88) and is closed only during the "full scale" calibration operation. The junction point between the battery 86 and the potentiometer 78 is connected to ground potential.

The potentiometer 82 is the only element that is adjusted or aligned at the factory in the system as shown. The potentiometer 82 is set to establish the output from the potentiometer 78 in substantially a millivolt relationship with the knob 22 (FIG. 1). It is also noteworthy that the battery 86 (FIG. 2) in the calibration circuit 38 may comprise a mercury cell (as may the batteries 66 and 68) thereby providing exceedingly long life in view of the isolation of these units during any intervals when the system is not in use.

Returning now to further consider the unit in relation to the assumed exemplary calibration, after the mutual setting operation for the variable resistor 74 in the potentiometer 78, the switch 40 (controlled by the switch button 24, FIG. 1) is set for "full" scale calibration, after which the variable resistor 58 (feedback) is adjusted to accomplish a full scale deflection of the meter movement 32. Normally, this adjustment is slight and serves merely to accommodate aging and like variations in components in the system. That is, as the potentiometer 78 provides a signal of substantially 25 millivolts to the amplifier 34 (which is controlled by the variable resistor 74 to operate at approximately a full scale output to the meter movement 32) the feedback resistor 58 is employed to accomplish the final adjustment to full scale. Subsequently, the switch 40 is set to the "zero" adjustment position in which the input to the amplifier 34 is ground potential. In that configuration, the trim resistor 72 is adjusted to accomplish a "zero" displacement of the meter movement 32.

The metering system is thus fully calibrated and ready for use, adjusted for a specific full scale range of 25 millivolts. The switch 40 therefore is set to couple the amplifier 34 to the input circuit 42 preparatory to taking actual measurements. In this regard, a reversing switch 90 is provided between the conductor 50 and ground potential so that either of the terminals 92 or 94 (input) may be employed as "positive." Upon establishing the desired polarity setting, the application of a millivolt signal between the terminals 92 and 94 is reflected by the meter movement 32 and accordingly manifest on the meter face 16 (FIG. 1). Specifically, in accordance with the example selected, as 100 divisions, are scaled to 25 millivolts, each division is representative of 25 of a millivolt. Thus, it is readily apparent that an effective and economical system is provided, which is exceedingly simple to calibrate and use. Additionally, the system is very flexible as will now be considered.

As indicated above, the unit as shown in FIG. 1, is capable of receiving various individual accessory packages 18 to adapt the system to alternate specific functions. For example, it is sometimes desirable to significantly expand the operating range of the system. For example, it may be desirable to provide a low-range setting at any value between zero and 100 millivolts and a high range setting at any level between zero and 200 millivolts.

Figure 3:
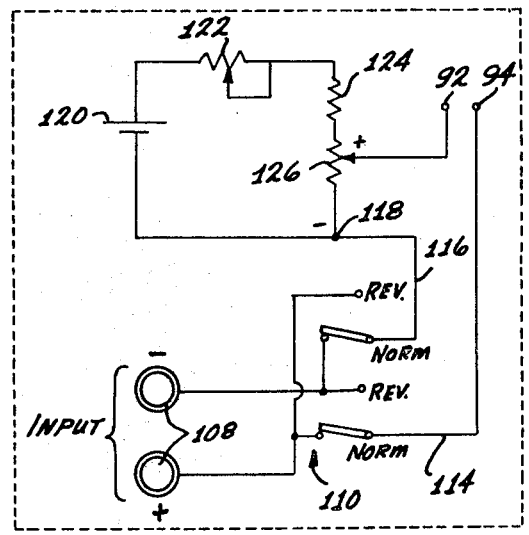
FIGS. 3, 4 and 5 are circuit diagrams showing alternate forms for an accessory portion of the metering system as shown in FIG. 1.

An accessory package as shown in FIG. 3 accommodates such operation. Specifically such an accessory package is physically represented in FIG. 1 and includes knobs 102 and 104, a polarity-reversing switch button 106 and a pair of connector sockets 108.

In the electrical presentation (FIG. 3) of the accessory package, the connector sockets 108 are connected through a reversing switch 110 (controlled by the switch button 106) to a loop circuit that includes the input to the basic meter. Specifically, a lower conductor 114 is connected directly to the terminal 94 while an upper conductor 116 is connected at the junction point 118 of a loop including a battery 120, a potentiometer 122, a resistor 124 and a potentiometer 126. The movable contact of the potentiometer 126 is then connected to the input terminal 94. Thus, by adjusting the potentiometers 122 and 126 (controlled respectively by the knobs 102 and 104, FIG. 1) biased inputs may be provided to accomplish a desired range scale of operation. For example, it may be desirable to check a particular signal to verify that it falls within a tolerance level specified for the unit from which it originates. For example, it may be desirable to verify that a signal falls between a level of 27 and 30 millivolts. To accommodate such a need the scale would be expanded to that range then as parts are individually tested, any output indicated by the meter will manifest the fact that the item of test is in tolerance.

Figure 4:
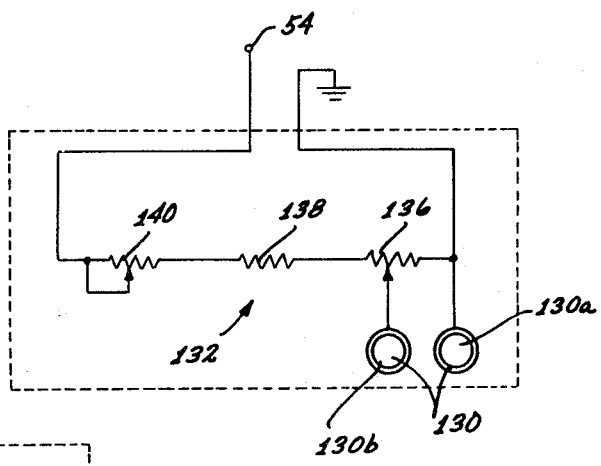

Another form for the accessory package 18 is shown in FIG. 4 the connector sockets 130 are connected through a voltage divider 132. Specifically, the right socket 130a is connected directly to ground potential, while the left socket 130b is connected to the variable contact of a potentiometer 136 which is serially connected with a resistor 138 and a potentiometer 140, the end of which is connected to the terminal 54. This accessory package affords a millivolt output from the system rather than meter operation. Of course, such a unit is useful in calibrating and checking other instruments.

Figure 5:
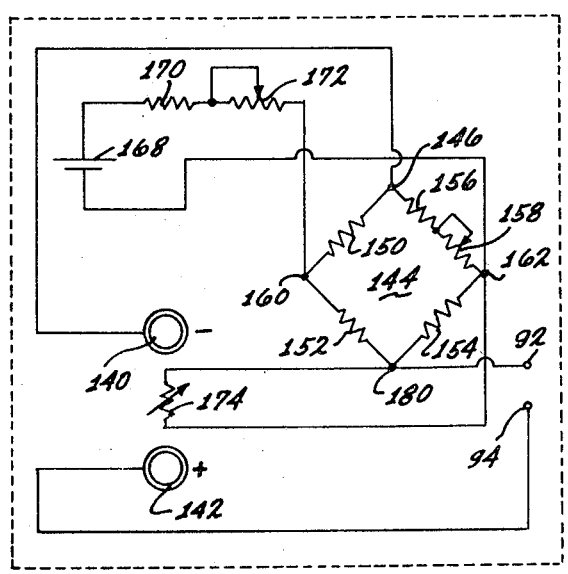

Still another form of accessory package is shown in FIG. 5 wherein an electrical bridge operation is provided as for use with thermocouples and like instrumentation units. Specifically, connector sockets 140 and 142 are connected with a bridge circuit 144 which is driven by a source of potential. More specifically, the connector socket 142 is connected directly to the terminal 94; however, the connector socket 140 is connected to a bridge terminal 146 at the top of the bridge circuit. The bridge circuit 144 includes resistors 150 and 152 which may be related by an order of magnitude, a resistor 154 and a series-connected combination of a resistor 156 and a potentiometer 158. The junction points 160 and 162 of the bridge are connected through a serial circuit including a battery 168, affixed resistor 170 and a potentiometer 172. Additionally, the junction point 162 is connected through a variable resistor 174 (in thermocouple temperature relationship) to the junction point 180 of the bridge. The unit incorporating this package accommodates specific instrumentation applications for the system hereof and accordingly is thus further effective to increase the flexibility of the unit hereof.

It may therefore be seen that as indicated above, the present system is flexible in application as well as being simple to use, economical to manufacture, rugged and durable in use. Additionally, the system is temperature stable in view of the combination calibration system and insulation block encompassing the amplifier. For example, if the system is calibrated in a particular environment, several hours of temperature stable operation can be anticipated due to the insulation afforded by the box 36.

What is claimed is:

1. A direct-current-metering system for manifesting the amplitude of an applied signal, comprising:
   input means for receiving said applied signal;
   a calibration means, including a potentiometer, for providing a variable-calibration signal;
   ground terminal means connected to ground potential;
   a DC operational amplifier including a variable-resistance gain control means for varying the output of said amplifier;
   an input-switching means for said operational amplifier for selectively coupling said operational amplifier to exclusively receive, said applied signal from said input means, said calibration signal from said calibration means and said ground potential from said ground terminal means;
   a calibration adjustment means coupled mutually to, said potentiometer of said calibration means and said variable-resistance gain control means of said operational amplifier to vary the gain of said operational amplifier concurrently with the amplitude of said calibration signal;
   a meter movement means coupled to the output of said operational amplifier; variable feedback resistor means in a feedback loop of said operational amplifier for adjusting full scale deflection of the meter movement when the source of calibration signal is applied to the input of the operational amplifier; and additional variable resistor means for adjusting the bias applied to the operational amplifier when the input of the operational amplifier is grounded to provide for zero deflection adjustment of the meter movement.

2. A direct-current-metering system in accordance with claim 1 wherein said variable feedback resistor means comprises a manual adjustment means.

3. A direct-current-metering system in accordance with claim 1 for use in association with various accessory packages, including receptacle terminal means for receiving said accessory packages to modify the input to said input means.

4. A metering system in accordance with claim 1 wherein said calibration adjustment means includes a dial for setting said potentiometer and said variable-resistance gain control means to a preselected value.